US011614242B2

(12) United States Patent
Jin et al.

(10) Patent No.: US 11,614,242 B2
(45) Date of Patent: Mar. 28, 2023

(54) AIR CONDITIONER

(71) Applicant: LG ELECTRONICS INC., Seoul (KR)

(72) Inventors: Hongsuk Jin, Seoul (KR); Sanghun Lee, Seoul (KR); Ingon Kim, Seoul (KR); Jongchul Choi, Seoul (KR); Taeseung Yoon, Seoul (KR); Yongjin Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 17/162,330

(22) Filed: Jan. 29, 2021

(65) Prior Publication Data

US 2021/0239330 A1  Aug. 5, 2021

(30) Foreign Application Priority Data

Jan. 31, 2020  (KR) .......................... 10-2020-011699

(51) Int. Cl.
*F24F 1/16* (2011.01)
*F24F 13/30* (2006.01)
(Continued)

(52) U.S. Cl.
CPC .................. *F24F 1/16* (2013.01); *F24F 1/08* (2013.01); *F24F 1/32* (2013.01); *F24F 13/30* (2013.01)

(58) Field of Classification Search
CPC ........ F24F 1/16; F24F 1/08; F24F 1/32; F24F 13/30; F24F 1/26; F25B 41/20
(Continued)

(56) References Cited

U.S. PATENT DOCUMENTS

2013/0167577 A1   7/2013  Street et al.
2018/0306462 A1* 10/2018  Ito ............................ F24F 11/84
2019/0186761 A1   6/2019  Blanton et al.

FOREIGN PATENT DOCUMENTS

JP  2008-232482 A  10/2008
JP  2010-107152 A   5/2010
(Continued)

OTHER PUBLICATIONS

PCT Search Report of PCT International Patent Appl. No. PCT/KR2021/001254, dated May 28, 2021 (3 pages).

*Primary Examiner* — Steve S Tanenbaum
(74) *Attorney, Agent, or Firm* — Birch, Stewart, Kolasch & Birch, LLP

(57) ABSTRACT

An air conditioner includes an outdoor unit having a compressor and an outdoor heat exchanger. A ventilator connected to the outdoor unit by refrigerant pipes allows outside air to pass through a heat exchanger and flow into an indoor space, and allows indoor air to pass through the heat exchanger and flow to an outdoor space. The ventilator includes a supply passage through which the outside air flows into the indoor space, and a discharge passage through which the indoor air is discharged to the outdoor space. The ventilaro also includes a main heat exchanger in the supply passage and a recovery heat exchanger in the discharge passage. A refrigerant distributor supplies the refrigerant from the outdoor unit to the main heat exchanger or the recovery heat exchanger, vice-versa. A reheat exchanger in the supply passage heats the air flowing therethrough.

14 Claims, 10 Drawing Sheets

(51) Int. Cl.
*F24F 1/08* (2011.01)
*F24F 1/32* (2011.01)

(58) Field of Classification Search
USPC .......................................................... 62/507
See application file for complete search history.

(56) References Cited

FOREIGN PATENT DOCUMENTS

| | | | |
|---|---|---|---|
| JP | 2010107152 A * | 5/2010 | |
| KR | 10-1337942 B1 | 12/2013 | |
| WO | WO-2019082377 A1 * | 5/2019 | ................ F24F 1/32 |

* cited by examiner

AIR CONDITIONER

BACKGROUND

1. Field

The present disclosure relates to an air conditioner, and more particularly to an air conditioner having a ventilator for heat exchanging air with a refrigerant.

2. Description of the Related Art

An indoor unit for controlling the temperature of an indoor space by circulating indoor air has a problem in that the indoor unit merely circulates stagnant air in the indoor space, such that fresh air may not be provided continuously for a user.

Accordingly, a ventilator may be used to continuously supply fresh outside air to the indoor space by introducing outside air and discharging indoor air.

The ventilator may control the temperature of air, supplied to the indoor space, by heat exchanging between indoor air, discharged to the outside, and outside air supplied to the indoor space, or may heat the air introduced into the indoor space by further including a heater.

Korean Patent Application No. 1020150122092 discloses a ventilation system based on dedicated outdoor air system (DOAS), in which by heat exchange between outdoor air and indoor air, air introduced from the outside is supplied to an indoor space; and a liquid desiccant is used to dehumidify the outside air flowing into the indoor space. In this system, there is a problem in that the outside air supplied to the indoor space may not be provided at a temperature desired by a user, such that it is difficult to properly control the temperature of the indoor space.

Further, Korean Patent Application No. 10-2010-0039582 discloses a method of supplying outside air to an indoor space by passing the outside air through a separate cooling coil. However, the method has a problem in that when the temperature of flowing air is controlled by using the cooling coil which consumes power separately, a large amount of power consumption is required, thereby reducing energy efficiency.

SUMMARY

It is an object of the present disclosure to provide an air conditioner having a ventilator for discharging indoor air to the outside and supplying outside air to an indoor space, in which power consumption for controlling the temperature of air supplied to the indoor space may be reduced by a refrigerant flowing system.

It is another object of the present disclosure to provide an air conditioner having a ventilator provided with a plurality of separate heat exchangers, in which heat exchange efficiency may be maximized by driving a compressor.

It is yet another object of the present disclosure to provide an air conditioner having a ventilator provided with a plurality of separate heat exchangers, in which temperature of air supplied to the indoor space may be finely controlled.

It is still another object of the present disclosure to provide an air conditioner having a ventilator provided with a plurality of separate heat exchangers, in which heating efficiency may be increased by pre-heating the outside air flowing into the ventilator.

The objects of the present disclosure are not limited to the aforementioned objects and other objects not described herein will be clearly understood by those skilled in the art from the following description.

In accordance with an aspect of the present disclosure, the above and other objects can be accomplished by providing an air conditioner, including: an outdoor unit having a compressor for compressing a refrigerant and an outdoor heat exchanger for heat exchange between the refrigerant and outside air; and a ventilator connected to the outdoor unit by a plurality of refrigerant pipes, and allowing the outside air to pass through at least one heat exchanger to flow into an indoor space and indoor air to pass through at least one heat exchanger to flow to an outside.

Further, the ventilator may include: a case having a supply passage, through which the outside air flows into the indoor space, and a discharge passage through which the indoor air is discharged to the outside; a main heat exchanger disposed in the supply passage and heat exchanging between flowing air and the refrigerant; a recovery heat exchanger disposed in the discharge passage and heat exchanging between the flowing air and the refrigerant; and a refrigerant distributor connected to the outdoor unit by the plurality of refrigerant pipes, and supplying the refrigerant, introduced from the outdoor unit, to the main heat exchanger or the recovery heat exchanger, or supplying the refrigerant, introduced from the main heat exchanger or the recovery heat exchanger, to the outdoor unit. Accordingly, the refrigerant may circulate through a plurality of heat exchangers disposed in the ventilator, so that heat exchange may be performed in different manners by the plurality of heat exchangers.

In addition, the ventilator may include a reheat exchanger disposed downstream of the main heat exchanger in the supply passage and connected to one of the plurality of refrigerant pipes, and heating the air flowing in the supply passage. Accordingly, it is possible to further heat the air discharged through the supply passage.

The plurality of refrigerant pipes may include: a liquid refrigerant line connected to the outdoor heat exchanger disposed in the outdoor unit; a high-pressure refrigerant line through which the refrigerant, compressed by the compressor, flows; and a low-pressure refrigerant line through which the refrigerant flows to the compressor.

The reheat exchanger may heat the flowing air by receiving the refrigerant, discharged from the compressor, through a first refrigerant branch line which is branched from the high-pressure refrigerant line.

The first refrigerant branch line may have a first opening and closing valve for opening and closing a passage formed in the first refrigerant branch line, and the first opening and closing valve may adjust an amount of the refrigerant supplied to the reheat exchanger, thereby heating the refrigerant discharged to the indoor space through the supply passage.

The main heat exchanger may be connected to a first indoor liquid line and a first indoor unit pipe with the refrigerant distributor, wherein the reheat exchanger may be connected to the first indoor liquid line, such that the refrigerant, having passed through the reheat exchanger, may flow to the first indoor liquid line, to be supplied to the main heat exchanger or the recovery heat exchanger.

The reheat exchanger may have a smaller area than the main heat exchanger, such that the air, having passed through the main heat exchanger, may be further heated.

The refrigerant distributor may include: a liquid refrigerant header connecting the liquid refrigerant line with each of the main heat exchanger and the recovery heat exchanger which are disposed on an inner surface of the case; a high-pressure refrigerant header connecting the high-pressure refrigerant line with each of the main heat exchanger and the recovery heat exchanger which are disposed on the inner surface of the case; and a low-pressure refrigerant header connecting the low-pressure refrigerant line with each of the main heat exchanger and the recovery heat exchanger which are disposed on the inner surface of the case.

The liquid refrigerant header may supply the refrigerant, flowing from the main heat exchanger, to the recovery heat exchanger or supplying the refrigerant, flowing from the recovery heat exchanger, to the main heat exchanger. Accordingly, the main heat exchanger and the recovery heat exchanger, being disposed in the ventilator, may be operated at the same time for heating and cooling operation.

The air conditioner may further include a total heat exchanger disposed over the supply passage and the discharge passage and heat exchanging between indoor air and outdoor air by rotating, such that a difference in temperature between the indoor air and the outside air may be used.

The total heat exchanger may be disposed upstream of the main heat exchanger in the supply passage, and may be disposed upstream of the recovery heat exchanger in the discharge passage, such that the air flowing into the heat exchangers may be heat exchanged preferentially.

The air conditioner may further include a preheat exchanger disposed in the supply passage and connected to the high-pressure refrigerant line, and heating the air flowing in the supply passage. The preheat exchanger may be disposed at an inlet end of the supply passage, through which the outside air flows into the case, thereby primarily heating the outside air flowing into the supply passage.

The preheat exchanger may receive the refrigerant, discharged from the compressor, through a second refrigerant branch line which is branched from the high-pressure refrigerant line, wherein the second refrigerant branch line may have a second opening and closing valve for opening and closing a passage formed in the second refrigerant branch line, such that the preheat exchanger may be selectively used.

During a cooling operation, in which the refrigerant flows from the liquid refrigerant header to the main heat exchanger, the second opening and closing valve may close the passage formed in the second refrigerant branch line, thereby stopping the cooling operation in which the main heat exchanger cools the flowing air.

Other detailed matters of the exemplary embodiments are included in the detailed description and the drawings.

Effects

The air conditioner according to the present disclosure has one or more of the following effects.

Firstly, temperature of air introduced into an indoor space may be controlled by a compressor driving system without using an auxiliary heat source, such that separate power consumption may be reduced.

Secondly, the main heat exchanger in the supply passage and the recovery heat exchanger in the discharge passage, which are disposed in the ventilator, perform heat exchange in an opposite manner, such that efficiency of a refrigeration system may be increased.

Thirdly, the refrigerant, compressed by the compressor, is supplied continuously to the reheat exchanger disposed downstream of the main heat exchanger, such that air discharged to the indoor unit may be further controlled.

Fourthly, by controlling the refrigerant supplied to the preheat exchanger for heating the air flowing into the supply passage, efficiency of the heating operation may be increased with the cooling operation.

The effects of the present disclosure are not limited to the aforesaid, and other effects not described herein will be clearly understood by those skilled in the art from the following description of the appended claims.

BRIEF DESCRIPTION OF THE DRAWINGS

FIGS. 7A and 7B are schematic diagrams illustrating an internal configuration of an outdoor unit according to an embodiment of the present disclosure, in which FIG. 7A illustrates a flow of a refrigerant during a cooling operation, and FIG. 7B illustrates a flow of a refrigerant during a heating operation.

DETAILED DESCRIPTION

Figure 1:
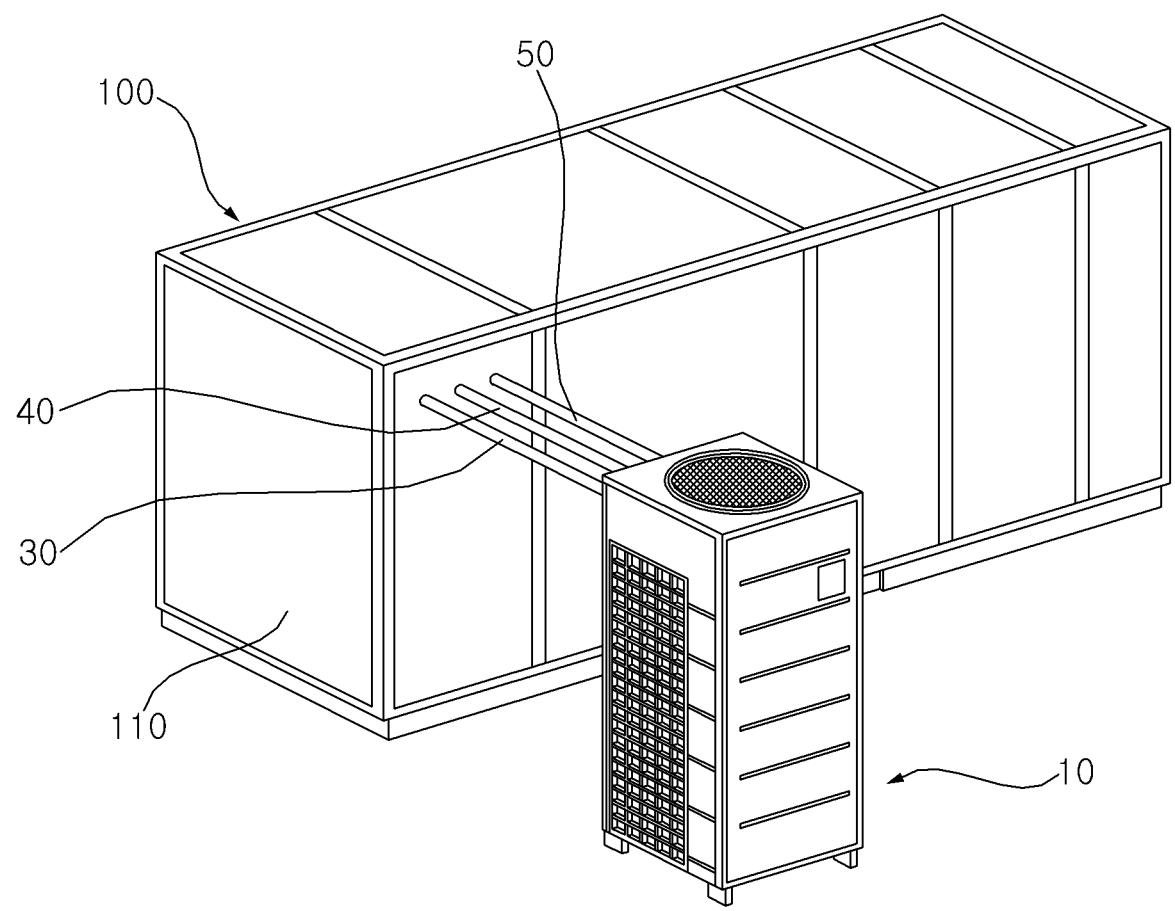
FIG. 1 is a schematic perspective view of an air conditioner including a ventilator, an outdoor unit, and a plurality of refrigerant pipes according to an embodiment of the present disclosure.

Advantages and features of the present disclosure and methods of accomplishing the same will be more clearly understood from exemplary embodiments described below with reference to the accompanying drawings. However, the present disclosure is not limited to the following embodiments but may be implemented in various different forms. The embodiments are provided only to complete disclosure of the present disclosure and to fully provide a person having ordinary skill in the art to which the present disclosure pertains with the category of the present disclosure, and the present disclosure will be defined by the scope of the appended claims. Wherever possible, like reference numerals generally denote like elements through the specification.

Hereinafter, embodiments of an air conditioner of the present disclosure will be described with reference to the accompanying drawings.

Overall Configuration

An overall configuration of an air conditioner including a ventilator and an outdoor unit of the present disclosure will be described below with reference to FIG. 1.

The air conditioner according to the present disclosure includes: a compressor 12 for compressing a refrigerant; an outdoor unit 10 including an outdoor heat exchanger 14 for heat exchanging between a refrigerant and outside air; a ventilator 100 for discharging heat-exchanged indoor air to the outside, and supplying heat-exchanged outside air to an indoor space; and a plurality of refrigerant pipes 30, 40, and 50 connecting the ventilator 100 and the outdoor unit 10.

The ventilator 100 may discharge the indoor air to the outside environment and may supply the outside air to the indoor space. The ventilator 100 may include a plurality of heat exchangers to heat or cool the outside air supplied to the indoor space. The ventilator 100 serves to heat exchange between the outside air and the indoor air. The ventilator 100 heat exchanges the indoor air and discharges the heat-exchanged air to the outside environment.

The ventilator 100 includes a refrigerant distributor 150 for delivering the refrigerant to each of the plurality of heat exchangers. The ventilator 100 may supply a liquid refrigerant or a gaseous refrigerant to each of the plurality of heat exchangers through the refrigerant distributor 150. Accordingly, each of the plurality of heat exchangers included in the ventilator 100 may cool flowing air while heating, at the same time, the flowing air.

The ventilator 100 may be connected to the outdoor unit 10 by the plurality of refrigerant pipes 30, 40, and 50. The ventilator 100 may be connected to the outdoor unit 10 by three refrigerant pipes. The plurality of refrigerant pipes 30, 40, and 50 may include a liquid line 30, through which a liquid refrigerant flows, a high-pressure refrigerant line 40, through which a high-pressure gaseous refrigerant flows, and a low-pressure refrigerant line 50, through which a low-pressure gaseous refrigerant flows.

The outdoor unit 10 may compress the refrigerant by the compressor 12 provided therein and may supply the compressed refrigerant to the outdoor heat exchanger 14 or to the ventilator 100.

Ventilator

A ventilator according to an embodiment of the present disclosure will be described below with reference to FIGS. 2 to 5B.

The ventilator 100 of the present disclosure is disposed between an indoor space and an outdoor space, and allows the indoor air to flow to the outside and outside air to flow into the indoor space. The ventilator 100 of the present disclosure may serve to introduce the outside air into the indoor space and discharge the indoor air to the outside environment.

Figure 4:
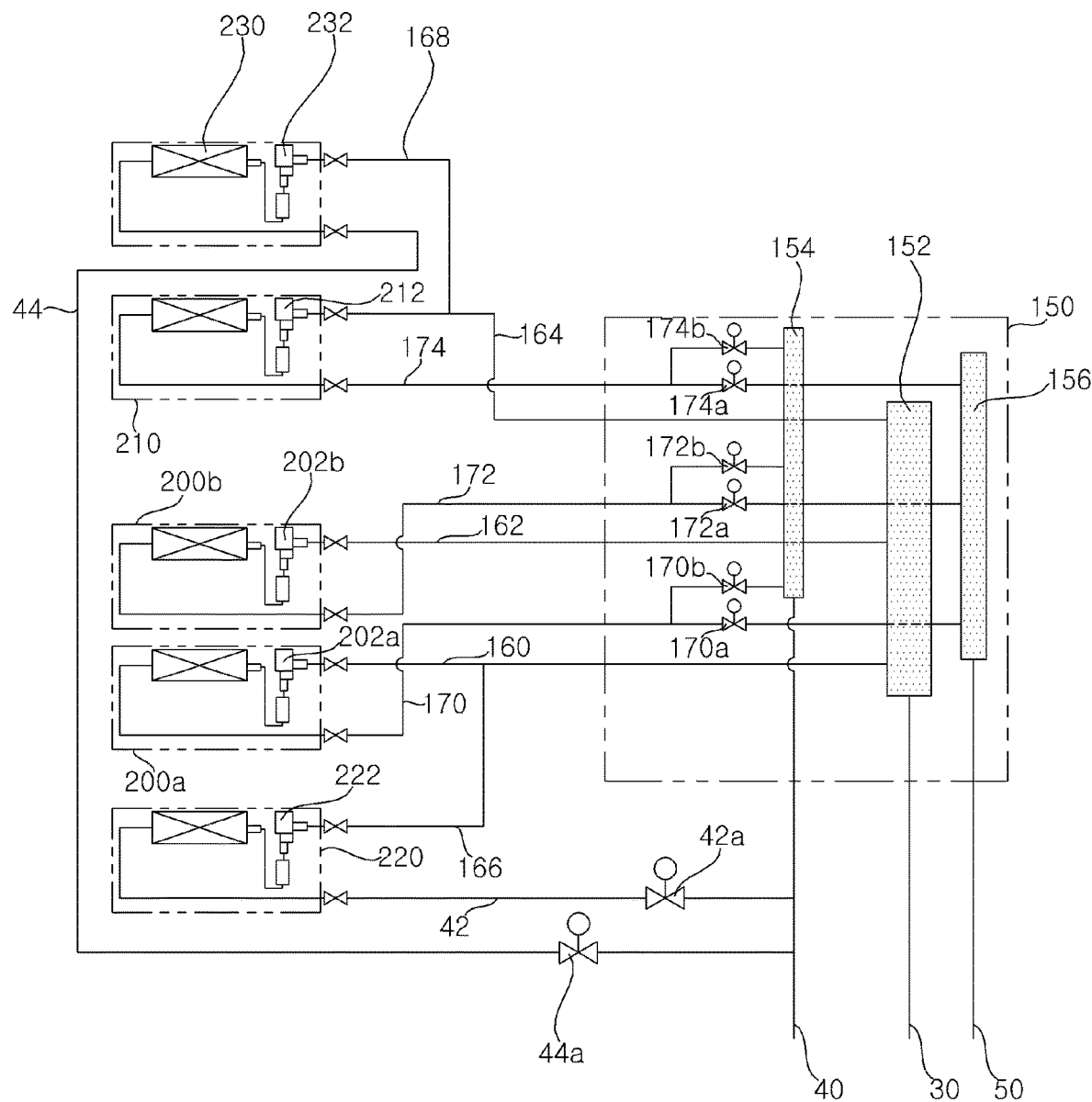
FIG. 4 is a system view illustrating a connection relationship between heat exchangers and a refrigerant distributor which are disposed in a ventilator according to an embodiment of the present disclosure.

The ventilator 100 may be connected to the outdoor unit 10 by the plurality of refrigerant pipes 30, 40, and 50. Referring to FIGS. 4 and 5, the ventilator 100 may be connected to the outdoor unit 10 by the liquid line 30, through which a liquid refrigerant flows, the high-pressure refrigerant line 40, through which a high-pressure gaseous refrigerant flows, and the low-pressure refrigerant line 50, through which a low-pressure gaseous refrigerant flows.

The ventilator 100 of the present disclosure includes: a case 110 having a supply passage 120, through which the outside air flows, and a discharge passage 122 through which the indoor air flows; a partition wall 124 disposed in the case 110 and separating the supply passage 120 and the discharge passage 122; a total heat exchanger 130 disposed on an inner surface of the case 110 and heat exchanging between the outside air, flowing through the supply passage 120, and the indoor air flowing through the discharge passage 122; a plurality of heat exchangers 200, 210, and 220 disposed in the supply passage 120 or the discharge passage 122 and heat exchanging between the flowing air and the refrigerant; and a refrigerant distributor 150 disposed in the case 110 and connecting the plurality of heat exchangers 200, 210, 220, and 230 and the outdoor unit 10.

The ventilator 100 may further include a first blower fan 140 rotatably disposed in the supply passage 120; a first blower motor 142 for rotating the first blower fan 140; a second blower fan 144 rotatably disposed in the discharge passage 122; and a second blower motor 146 for rotating the second blower fan 144.

The plurality of heat exchangers include: a main heat exchanger 200 disposed in the supply passage 120 and heat exchanging between the refrigerant and the flowing outside air; a recovery heat exchanger 210 disposed in the discharge passage 122 and heat exchanging between the refrigerant and the flowing indoor air; and a reheat exchanger 220 disposed in the supply passage 120 and heat exchanging between the refrigerant and the outside air having passed through the main heat exchanger 200. The plurality of heat exchangers may further include a preheat exchanger 220 disposed in the supply passage 120 and heating air flowing into the supply passage 120.

The case 110 has the supply passage 120 and the discharge passage 122 formed therein. The case 110 forms a space in which the refrigerant distributor 150 is disposed. The space, in which the refrigerant distributor 150 is disposed, may be a space that separates the supply passage 120 and the discharge passage 122. Further, the refrigerant distributor 150 may be disposed on one side of the supply passage 120 or the discharge passage 122. The refrigerant distributor 150 may be disposed at a position not obstructing the flow of air.

The case 110 has an outside air inlet 116 which is formed on one side of the supply passage 120, and through which the inside of the case 110 communicates with the outside space; and an outside air supply port 118 which is formed on the other side of the supply passage 120, and through which the inside of the case 110 communicates with the indoor space. The case 110 has an indoor air outlet 114 which is formed on one side of the discharge passage 122, and through which the inside of the case 110 communicates with the outside space; and an indoor air inlet 112 which is formed on the other side of the discharge passage 122, and through which the inside of the case 110 communicates with the indoor space.

The outside air inlet 116 and the outside air supply port 118 may be disposed in a vertical direction. The indoor air inlet 112 and the indoor air outlet 114 may be disposed in a vertical direction.

Figure 2:
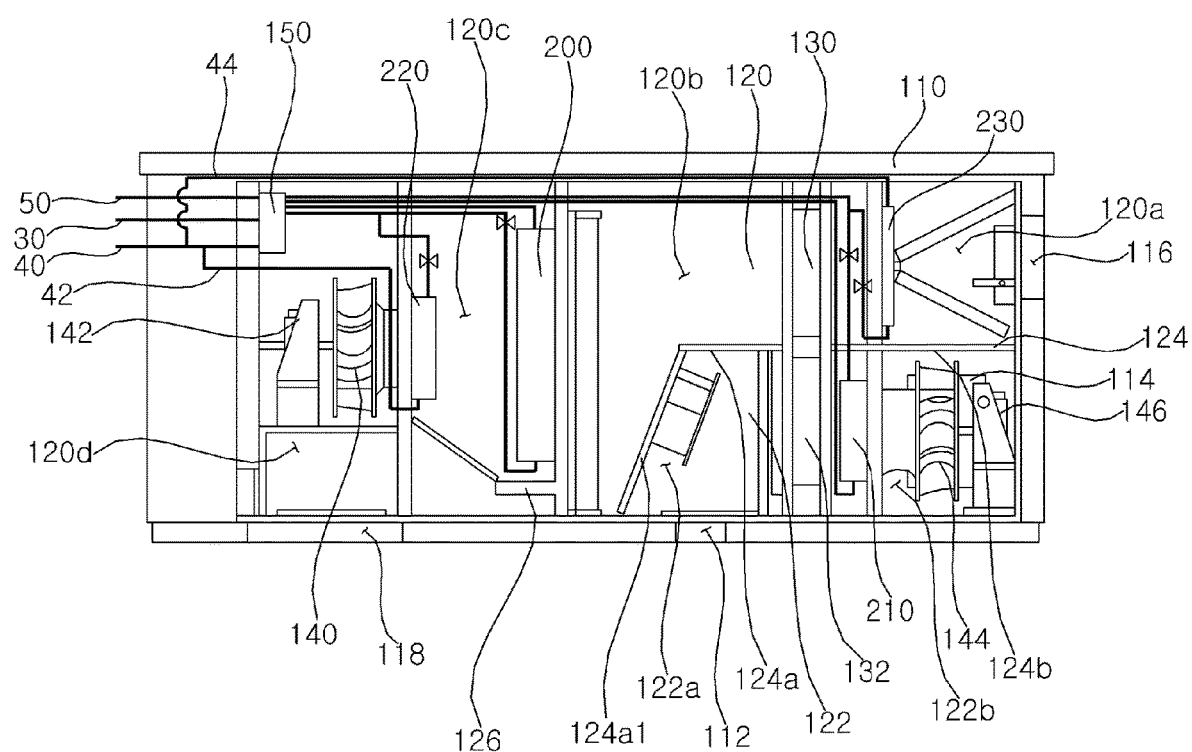
FIG. 2 is a schematic cross-sectional view of a ventilator according to an embodiment of the present disclosure.

The supply passage 120 is shorter than the discharge passage 122. Referring to FIG. 2, the supply passage 120 may be a vertical passage having an inverted "L" shape.

The supply passage 120 may include: a first supply passage 120a formed between the outside air inlet 116 and the total heat exchanger 130; a second supply passage 120b formed between the total heat exchanger 130 and the main heat exchanger 200; a third supply passage 120c formed between the main heat exchanger 200 and the reheat exchanger 220; and a fourth supply passage 120d formed between the reheat exchanger 220 and the outside air supply port 118.

A preheat exchanger 230 for heating the air flowing into the outside air inlet 116 may be disposed in the first supply passage 120a.

The second supply passage 120b has a flow cross-sectional area which increases from an upstream side toward a downstream side in an air flow direction. The main heat exchanger 200 is disposed at a downstream end portion of the second supply passage 120b. As the air, flowing through the second supply passage 120b, flows downstream, the flow velocity of the air decreases and the passage is expanded, such that a large amount of air may be heat exchanged by the main heat exchanger 200.

A drain pan 126 for temporarily storing condensate and discharging the condensate to the outside may be disposed at a lower side of the main heat exchanger 200.

The third supply passage 120*c* has a flow cross-sectional area which decreases from an upstream side toward a downstream side in an air flow direction. Accordingly, the condensate, generated in the air flowing through the third supply passage 120*c*, may flow to the drain pan 126. A flow velocity of the air flowing through the third supply passage 120*c* may be gradually increased.

The first blower fan 140 is disposed in the fourth supply passage 120*d*. The fourth supply passage 120*d* may be perpendicular to the third supply passage 120*c*. The first blower fan 140 allows the air, having passed through the reheat exchanger 220, to flow to the outside air supply port 118. As the first blower fan 140, a cross flow fan may be used, which draws in air in a direction parallel to a rotation axis and discharges the air in a direction perpendicular to the rotation axis.

The discharge passage 122 may include a first discharge passage 122*a*, formed between the indoor air inlet 112 and the total heat exchanger 130, and a second discharge passage 122*b* formed between the total heat exchanger 130 and the indoor air outlet 114.

The second discharge passage 122*b* is disposed below the first supply passage 120*a*. The first discharge passage 122*a* is disposed below the second supply passage 120*b*.

The first discharge passage 122*a* is perpendicular to the second discharge passage 122*b*.

The recovery heat exchanger 210 is disposed in the second discharge passage 122*b*. The second blower fan 144 is disposed in the second discharge passage 122*b* to cause the air, flowing in the discharge passage 122, to flow to the indoor air outlet 114.

The partition wall 124 for separating the supply passage 120 and the discharge passage 122 is disposed in the case 110.

The partition wall 124 may include a first partition wall 124*a* separating the second supply passage 120*b* and the first discharge passage 122*a*, and a second partition wall 124*b* separating the first supply passage 120*a* and the second discharge passage 122*b*.

The second partition wall 124*b* may be formed as a horizontal plate for separating the first supply passage 120*a* and the second discharge passage 122*b*. The first partition wall 124*a* may have an inclined surface 124*a*1 for expanding a flow cross-sectional area of the second supply passage 120*b*.

The total heat exchanger 130 is a device for recovering sensible heat and latent heat by using a temperature difference and a humidity difference between the outside air and return air while rotating a heat exchange body at a low speed. The total heat exchanger 130 may be formed as a cylindrical body, and has an internal structure which is formed as a honeycomb structure, thereby allowing the air to pass therethrough.

The total heat exchanger 130 may recover sensible heat and latent heat by using a temperature difference and a humidity difference between the outside air and return air while rotating a heat exchange body 132 at a low speed. The heat exchange body 132, made of aluminum as a base material, may recover sensible heat based on the heat transfer characteristics of aluminum. Further, aluminum is impregnated with a desiccant, such that the heat change body 132 may recover latent heat based on water vapor adsorption characteristics.

The total heat exchanger 130 may be disposed over both the supply passage 120 and the discharge passage 122. Each of the plurality of heat exchangers 200, 210, and 220 may be connected to the refrigerant distributor 150 by a plurality of indoor unit pipes 170, 172, and 174 and a plurality of indoor liquid lines 160, 162, and 164.

The main heat exchanger 200 may be disposed downstream of the total heat exchanger 130 in the supply passage 120. The main heat exchanger 200 may be disposed at a portion of the supply passage 120, in which a cross-sectional area is expanded. The main heat exchanger 200 may exchange heat with air in a larger area than the reheat exchanger 220. The main heat exchanger 200 may be connected to the refrigerant distributor 150 to receive a compressed refrigerant supplied from the high-pressure refrigerant line 40, or a liquid refrigerant supplied from the liquid line 30.

Figure 3:
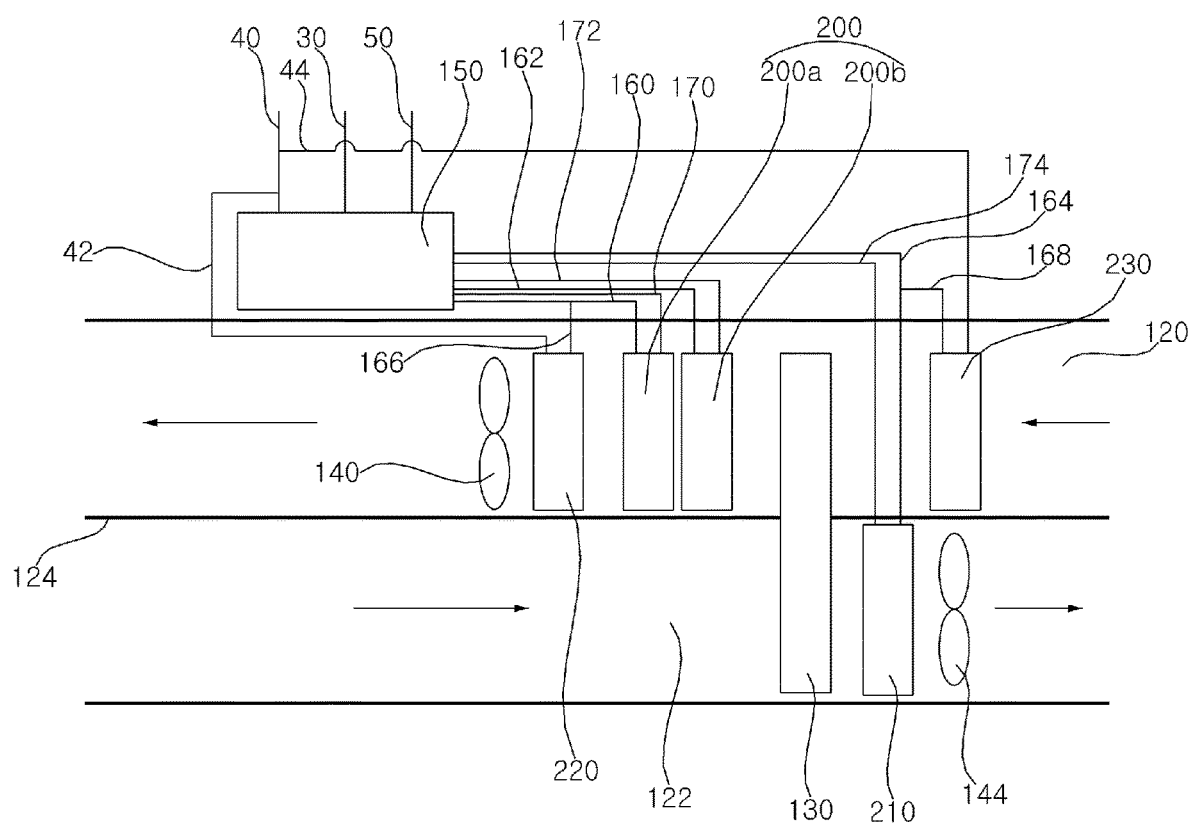
FIG. 3 is a diagram explaining air flowing through the ventilator according to an embodiment of the present disclosures.

Referring to FIGS. 3 and 4, the main heat exchanger 200 may include a first main heat exchanger 200*a* and a second main heat exchanger 200*b*. The first main heat exchanger 200*a* and the second main heat exchanger 200*b* may be disposed in the supply passage 120, in parallel to each other in an air flow direction. The first main heat exchanger 200*a* and the second main heat exchanger 200*b* may be vertical to each other in the air flow direction in the supply passage 120. The first main heat exchanger 200*a* may be disposed closer to the preheat exchanger 230 than the second main heat exchanger 200*b*.

The recovery heat exchanger 210 may be disposed downstream of the total heat exchanger 130 in the discharge passage 122. The recovery heat exchanger 210 heats or cools the indoor air flowing to the outside space through the discharge passage 122. The recovery heat exchanger 210 may operate in an opposite manner to the main heat exchanger 200. Here, operation in the opposite manner may indicate that a heat exchange operation for heating or cooling the air may be performed in different manners. That is, when the main heat exchanger 200 cools the air flowing through the supply passage 120, the recovery heat exchanger 210 heats the air flowing through the discharge passage 122; and when the main heat exchanger 200 heats the air flowing through the supply passage 120, the recovery heat exchanger 210 cools the air flowing through the discharge passage 122.

The recovery heat exchanger 210 may be disposed upstream of the second blower fan 144 in the discharge passage 122.

The reheat exchanger 220 may be disposed downstream of the main heat exchanger 200 in the supply passage 120. The reheat exchanger 220 may be disposed at an inlet end of the first blower fan 140, such that the reheat exchanger 220 may heat the air flowing into the inlet end of the first blower fan 140. The reheat exchanger 220 may receive a refrigerant, discharged from the compressor 12, through a first refrigerant branch line 42 which is branched from the high-pressure refrigerant line 40. The first refrigerant branch line 42 may connect the high-pressure refrigerant line 40 and the reheat exchanger 220 without passing through the refrigerant distributor 150.

The reheat exchanger 220 supplies the heat-exchanged refrigerant to a first indoor unit pipe 160 which will be described later. The first refrigerant branch line 42 has a first opening and closing valve 42*a* to open and close a passage formed in the first refrigerant branch line 42. Accordingly, by controlling the first opening and closing valve 42*a*, the refrigerant may be supplied to the reheat exchanger 220 or the supply of the refrigerant may be stopped. By controlling the first opening and closing valve 42a, it is possible to control whether to heat the air passing through the reheat exchanger 220.

The first opening and closing valve 42a may control a degree of opening of the passage formed in the first refrigerant branch line 42. The first opening and closing valve 42a may control the temperature of flowing air by adjusting an amount of the refrigerant supplied to the reheat exchanger 220.

The preheat exchanger 230 is disposed at an inlet end of the supply passage 120 having the outside air inlet 116. The preheat exchanger 230 is disposed upstream of the total heat exchanger 130 in the supply passage 120. The preheat exchanger 230 is disposed in the first supply passage 120a. The preheat exchanger 230 may receive the refrigerant, discharged from the compressor 12, through a second refrigerant branch line 44 which is branched from the high-pressure refrigerant line 40. The second refrigerant line 44 may connect the high-pressure refrigerant line 40 and the preheat exchanger 230 without passing through the refrigerant distributor 150.

The preheat exchanger 230 supplies the heat-exchanged refrigerant to a third indoor unit pipe 164 which will be described later. The second refrigerant branch line 44 has a second opening and closing valve 44a to open and close a passage formed in the second refrigerant branch line 44. Accordingly, by controlling the second opening and closing valve 44a, the refrigerant may be supplied to the preheat exchanger 230 or the supply of the refrigerant may be stopped. By controlling the second opening and closing valve 44a, it is possible to control whether to heat the air passing through the preheat exchanger 230

The refrigerant distributor 150 may be connected to the outdoor unit 10 and each of the plurality of heat exchangers 200a, 200b, and 210. The refrigerant distributor 150 may be connected to the outdoor unit 10 by the liquid line 30, the high-pressure refrigerant line 40, and the low-pressure refrigerant line 50.

The refrigerant distributor 150 may be disposed on the inner surface of the case 110. The refrigerant distributor 150 may be connected to each of the plurality of heat exchangers 200a, 200b, and 210, which are disposed in the ventilator 100, by the plurality of indoor unit pipes 170, 172, and 174, and the plurality of indoor liquid lines 160, 162, and 164. The plurality of indoor unit pipes 170, 172, and 174 may include a first indoor unit pipe 170 connected to the first main heat exchanger 200a, a second indoor unit pipe 172 connected to the second main heat exchanger 200b, and a third indoor unit pipe 174 connected to the recovery heat exchanger 210.

Each of the plurality of indoor unit pipes 170, 172, and 174 may be branched from the inside of the refrigerant distributor 150, to be connected to a high-pressure refrigerant header 154 and a low-pressure refrigerant header 156. Flow control valves 170a, 170b, 172a, 172b, 174a, and 174b for controlling a flow of the refrigerant may be provided for each of the branched indoor unit pipes 170, 172, and 174.

The plurality of indoor liquid lines 160, 162, and 164 may include a first indoor liquid line 160 connected to the first main heat exchanger 200a, a second indoor liquid line 162 connected to the second main heat exchanger 200b, and a third indoor liquid line 164 connected to the recovery heat exchanger 210.

Indoor heat exchanger expansion valves 202a, 202b, and 212 may be provided for each of the plurality of indoor liquid lines 160, 162, and 164. Accordingly, the indoor heat exchanger expansion valves 202a, 202b, and 212, disposed at each of the plurality of indoor liquid lines 160, 162, and 164, may expand the refrigerant flowing through each of the plurality of indoor liquid lines 160, 162, and 164.

The reheat exchanger 220 may be connected to the first indoor liquid line 160 by a first liquid joined line 166. The preheat exchanger 230 may be connected to the third indoor liquid line 164 by a second liquid joined line 168. An expansion valve for expanding the flowing refrigerant may be disposed at each of the first liquid joined line 166 and the second liquid joined line 168.

The refrigerant distributor 150 may be connected to the first main heat exchanger 200a by the first indoor liquid line 160 and the first indoor unit pipe 170. The refrigerant distributor 150 may be connected to the second main heat exchanger 200b by the second indoor liquid line 162 and the second indoor unit pipe 172. The refrigerant distributor 150 may be connected to the recovery heat exchanger 210 by the third indoor liquid line 164 and the third indoor unit pipe 174.

The refrigerant distributor 150 may include a liquid refrigerant header 152 connecting the liquid line 30 with each of the plurality of heat exchangers 200a, 200b, and 210; the high-pressure refrigerant header 154 connecting the high-pressure refrigerant line 40 with each of the plurality of heat exchangers 200a, 200b, and 210; and the low-pressure refrigerant header 156 connecting the low-pressure refrigerant line 50 with each of the plurality of heat exchangers 200a, 200b, and 210.

The liquid refrigerant header 152 connects the liquid line 30 with each of the plurality of indoor liquid lines 160, 162, and 164. The high-pressure refrigerant header 154 connects the high-pressure refrigerant line 40 with each of the plurality of indoor unit pipes 170, 172, and 174. The low-pressure refrigerant header 156 connects the low-pressure refrigerant line 50 with each of the plurality of indoor unit pipes 170, 172, and 174.

Figure 6A:
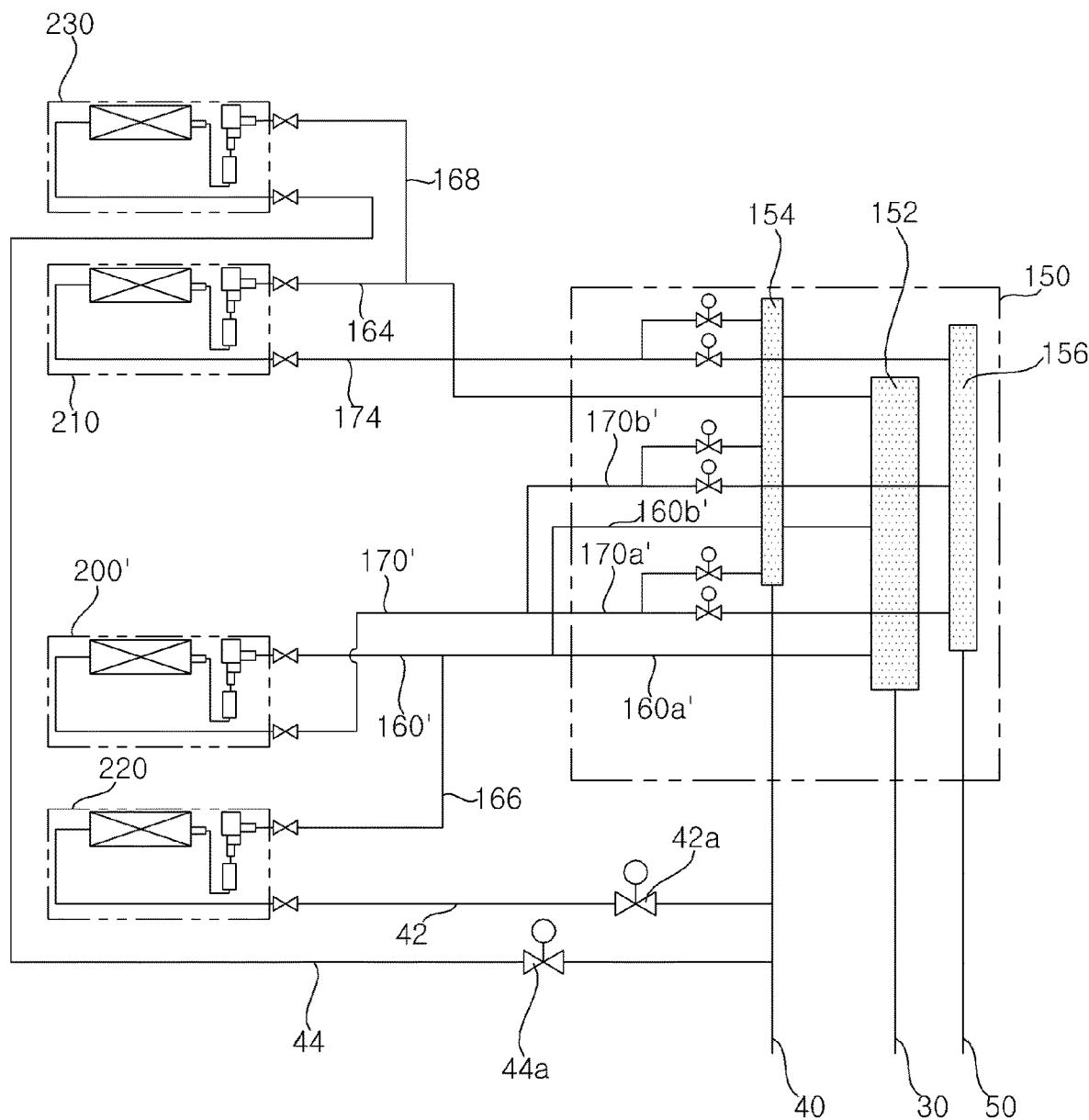
FIG. 6A is a system view illustrating a connection relationship between heat exchangers and a refrigerant distributor which are disposed in a ventilator according to another embodiment of the present disclosure.

Hereinafter, a refrigeration system of a ventilator according to another embodiment of the present disclosure will be described with reference to FIG. 6A. The following description will be focused on differences from the refrigeration system of the ventilator of FIG. 4. In FIG. 6A, the same reference numerals as those of FIG. 4 may indicate the same or like parts performing the same functions.

Referring to FIG. 6A, the ventilator 100 according to the embodiment includes one main heat exchanger 200'. The main heat exchanger 200' is connected to the refrigerant distributor 150 by a first indoor unit pipe 170' and a first indoor liquid line 160'. The first indoor unit pipe 170' is branched at the outside of the refrigerant distributor 150 into a first sub-first indoor unit pipe 170a' and a second sub-first indoor unit pipe 170b'. Accordingly, each of the first sub-first indoor unit pipe 170a' and the second sub-first indoor unit pipe 170b' may be branched individually, to be connected to the high-pressure refrigerant header 154 and the low-pressure refrigerant header 156.

The first indoor liquid line 160' is branched at the outside of the refrigerant distributor 150 into a first sub-first indoor liquid line 160a' and a second sub-first indoor liquid line 160b'. Accordingly, each of the first sub-first indoor liquid line 160a' and the second sub-first indoor liquid line 160b' may be branched individually, to be connected to the liquid refrigerant header 152.

Hereinafter, a refrigeration system of a ventilator according to yet another embodiment of the present disclosure will be described with reference to FIG. 6B.

Figure 6B:
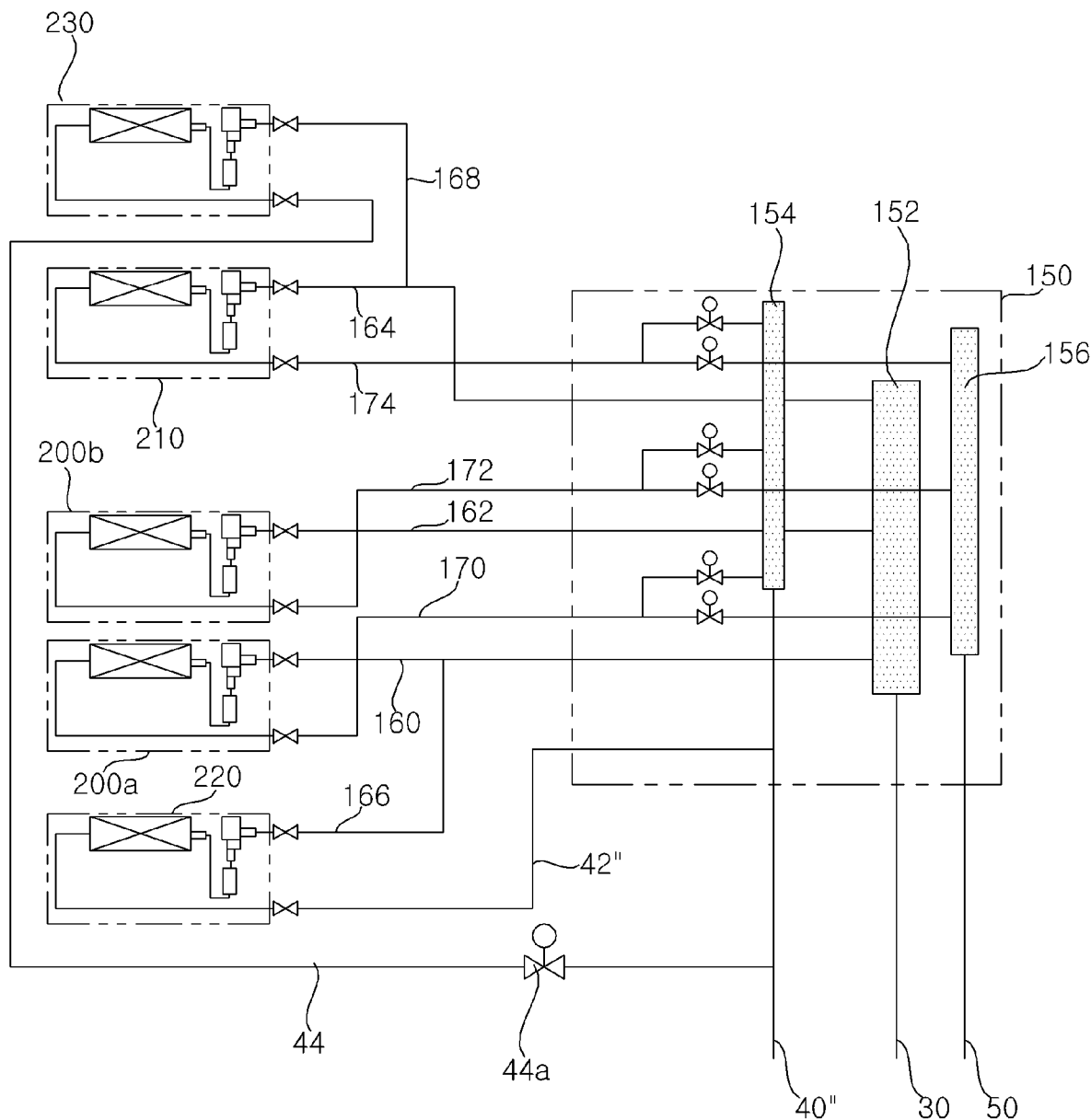
FIG. 6B is a system view illustrating a connection relationship between heat exchangers and a refrigerant distributor which are disposed in a ventilator according to yet another embodiment of the present disclosure.

Referring to FIG. 6B, a first refrigerant branch line 42' may be branched from a high-pressure refrigerant line 40' disposed in the refrigerant distributor 150. No valve is disposed at the first refrigerant branch line 42', such that a portion of the refrigerant continuously flowing through the high-pressure refrigerant line 40' may be supplied to the reheat exchanger 220.

Outdoor Unit

A configuration of an outdoor unit of the present disclosure will be described below with reference to FIGS. 7A and 7B.

The outdoor unit 10 includes: a compressor 12 for compressing a refrigerant; an outdoor heat exchanger 14 disposed in the outdoor unit 10 and heat exchanging between a refrigerant and outside air; a first switching valve 18 for delivering the refrigerant, discharged from the compressor 12, to the ventilator 100 or delivering the refrigerant, supplied from the ventilator 100, to the compressor 12; and a second switching valve 20 for delivering the refrigerant, discharged from the compressor 12, to the outdoor heat exchanger 14 or delivering the refrigerant, introduced from the outdoor heat exchanger 14, to the compressor 12.

A compressor discharge pipe, allowing the refrigerant discharged from the compressor 12 to flow, may be branched to be connected to each of the first switching valve 18 and the second switching valve 20.

The first switching valve 18 may be connected to the compressor 12, the low-pressure refrigerant line 50, and the high-pressure refrigerant line 40. The second switching valve 20 may be connected to the compressor 12, the outdoor heat exchanger 14, and the low-pressure refrigerant line 50.

The outdoor unit 10 may further include an outdoor blower fan 16 disposed adjacent to the outdoor heat exchanger 14 and generating a flow of air around the outdoor heat exchanger 14. The outdoor heat exchanger 14 is connected to the liquid line 30, and delivers the liquid refrigerant, heat-exchanged by the outdoor heat exchanger 14, to the ventilator 100. The outdoor heat exchanger 14 may receive the heat-exchanged liquid refrigerant from the ventilator 100 through the liquid line 30. The outdoor unit 10 has an outdoor unit expansion valve 22 for expanding the refrigerant flowing in the liquid line 30.

The outdoor unit 10 may be connected to the ventilator 100 by the liquid line 30, the high-pressure refrigerant line 40, and the low-pressure refrigerant line 50. The liquid line 30 connects the outdoor heat exchanger 14 and the refrigerant distributor 150 of the ventilator 100. The high-pressure refrigerant line 40 connects the first switching valve 18 and the refrigerant distributor 150. The low-pressure refrigerant line 50 connects the second switching valve 20 or the compressor 12 and the refrigerant distributor 150.

Operation

The flow of a refrigerant and air during a cooling operation and a heating operation of an air conditioner of the present disclosure will be described below with reference to FIGS. 6A to 7B.

The air conditioner of the present disclosure may operate in a cooling mode for a cooling operation and in a heating mode for a heating operation. The cooling mode and the heating mode may be determined based on the first main heat exchanger 200a and the second main heat exchanger 200b disposed in the ventilator 100.

The first blower fan 140 and the second blower fan 144 operate during the cooling operation or the heating operation of the air conditioner. During the cooling operation or the heating operation of the air conditioner, the total heat exchanger 130 operates and the heat exchange body 132 rotates to heat exchange between the air flowing through the supply passage 120 and the air flowing through the discharge passage 122.

Figure 7A:
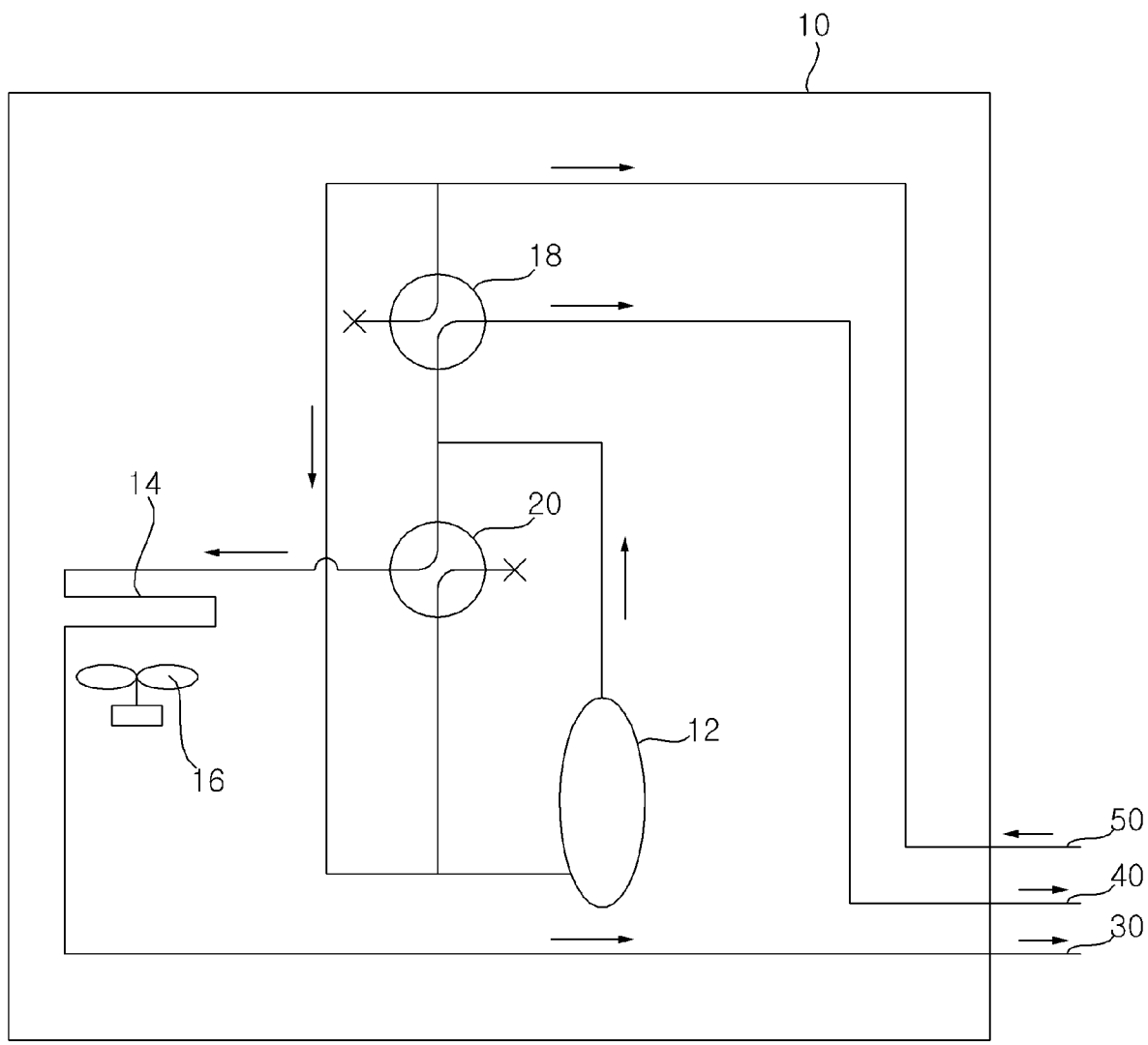

Referring to FIG. 7A, during the cooling operation of the air conditioner, the refrigerant discharged from the compressor 12 flows to the high-pressure refrigerant line 40 through the first switching valve 18. Further, the refrigerant discharged from the compressor 12 flows to the outdoor heat exchanger 14 through the second switching valve 20. The refrigerant, having passed through the outdoor heat exchanger 14, flows to the liquid line 30. In addition, the refrigerant, supplied from the ventilator 100 through the low-pressure refrigerant line 50, flows to the compressor 12.

Figure 7B:
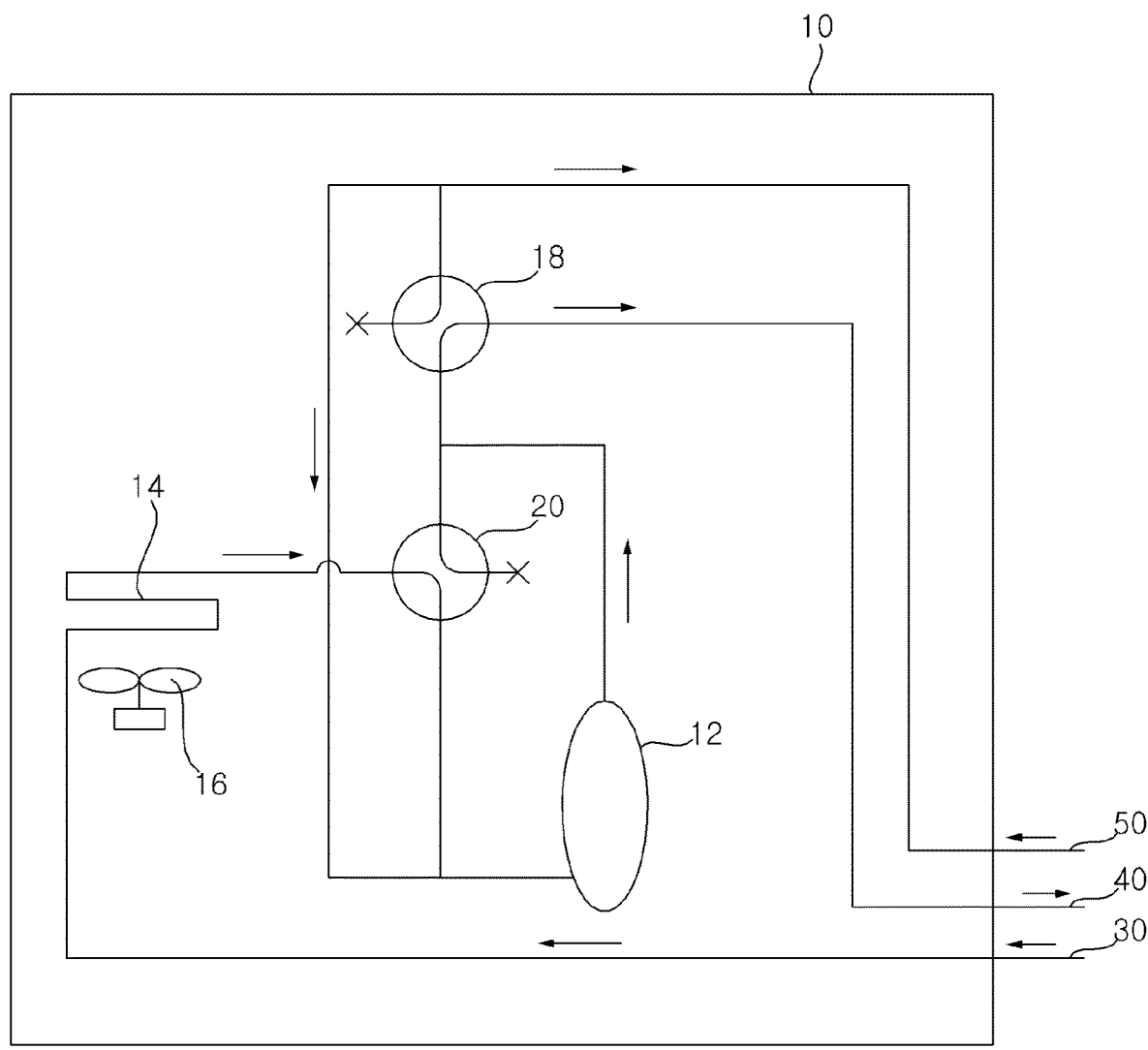

Referring to FIG. 7B, during the heating operation of the air conditioner, the refrigerant discharged from the compressor 12 flows to the high-pressure refrigerant line 40 through the first switching valve 18. The refrigerant, supplied from the ventilator 100 through the low-pressure refrigerant line 50, flows to the compressor 12. Further, the refrigerant, supplied from the ventilator 100 through the liquid line 30, flows to the outdoor heat exchanger 14, to be supplied to the compressor 12 through the second switching valve 20.

Figure 5A:
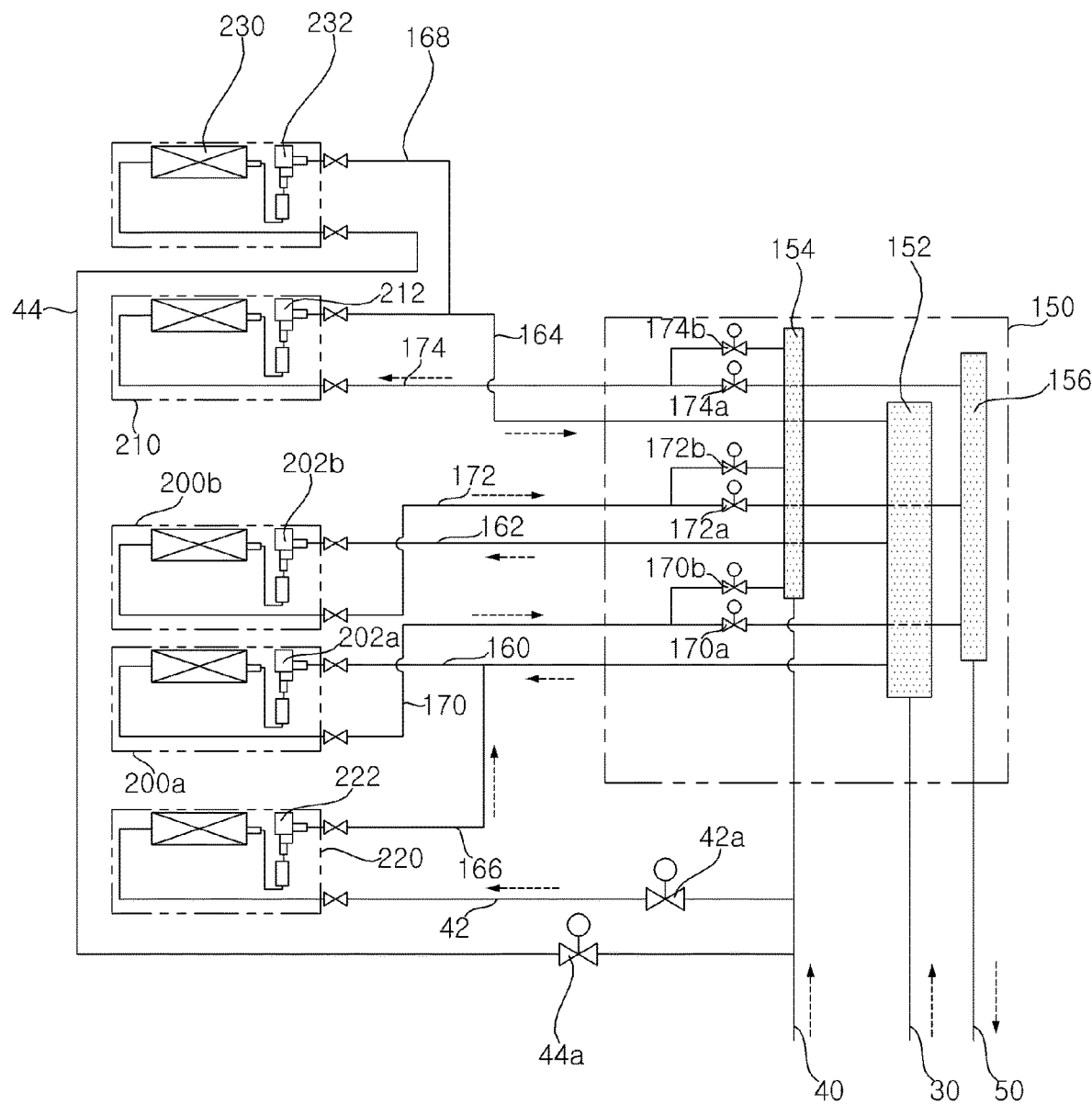
FIG. 5A is a diagram illustrating a flow of a refrigerant during a cooling operation in the system view of FIG. 4.

Referring to FIG. 5A, during the cooling operation of the air conditioner, the first main heat exchanger 200a and the second main heat exchanger 200b are connected to each of the liquid refrigerant header 152 and the low-pressure refrigerant header 156. During the cooling operation of the air conditioner, the recovery heat exchanger 210 is connected to each of the high-pressure refrigerant header 14 and the liquid refrigerant header 152.

Each of the reheat exchanger 220 and the preheat exchanger 230 is connected to the high-pressure refrigerant line 40, and the flow of the refrigerant is not changed according to the cooling operation or the heating operation. However, the first opening and closing valve 42a, disposed at the first refrigerant branch line 42, and the second opening and closing valve 44a, disposed at the second refrigerant branch line 44, may be opened and closed according to the cooling operation or the heating operation of the ventilator 100.

Referring to FIG. 5A, the first opening and closing valve 42a, disposed at the first refrigerant branch line 42, is opened during the cooling operation of the air conditioner. The second opening and closing valve 44a, disposed at the second refrigerant branch line 44, is closed during the cooling operation of the air conditioner. That is, during the cooling operation of the air conditioner, the second opening and closing valve 44a disposed at the second refrigerant branch line 44 is closed, such that the refrigerant may not flow to the preheat exchanger 230.

Referring to FIG. 5A, during the cooling operation of the air conditioner, the first opening and closing valve 42a is opened such that a high-pressure gaseous refrigerant, flowing through the high-pressure refrigerant line 40, may flow to the reheat exchanger 220 through the first refrigerant branch line 42. The refrigerant, having passed through the reheat exchanger 220, flows through the first liquid joined line 166 to the first indoor liquid line 160 and to the first main heat exchanger 200a.

During the cooling operation of the air conditioner, the first main heat exchanger 200a and the second main heat exchanger 200b cool the air flowing in the supply passage 120. During the cooling operation of the air conditioner, the recovery heat exchanger 210 heats the air flowing in the discharge passage 122. During the cooling operation of the air conditioner, the reheat exchanger 220 heats the air flowing in the supply passage 120.

During the cooling operation of the air conditioner, the air flowing in the supply passage 120 is heat exchanged with the indoor air by the total heat exchanger 130. During the cooling operation of the air conditioner, the air flowing in the supply passage 120 may be primarily cooled by heat exchange with cold air flowing in the discharge passage 122.

During the cooling operation of the air conditioner, the air flowing in the supply passage 120 after passing through the total heat exchanger 130 is cooled by passing through the first main heat exchanger 200a and the second main heat exchanger 200b. In this case, condensate may be generated in the cooled air. During the cooling operation of the air conditioner, the flowing air, having passed through the first main heat exchanger 200a and the second main heat exchanger 200b, may be dried by passing through the reheat exchanger 220. The reheat exchanger 220 is smaller in size than the first main heat exchanger 200a and the second main heat exchanger 200b, and has a lower heat duty than the first main heat exchanger 200a and the second main heat exchanger 200b, such that the air discharged from the outside air supply port 118 may be cooled and dried air. Accordingly, during the cooling operation of the air conditioner, the ventilator 100 may supply cooled and dried air to the indoor space.

During the cooling operation of the air conditioner, the air flowing in the discharge passage 122 may be heat exchanged with the outside air by the total heat exchanger 130. During the cooling operation of the air conditioner, the air flowing in the discharge passage 122 may be heated by passing through the recovery heat exchanger 210.

During the cooling operation of the air conditioner, the refrigerant discharged from the compressor 12 may be supplied to the high-pressure refrigerant line 40 through the first switching valve 18, and may be supplied to the outdoor heat exchanger 14 through the second switching valve 20.

Figure 5B:
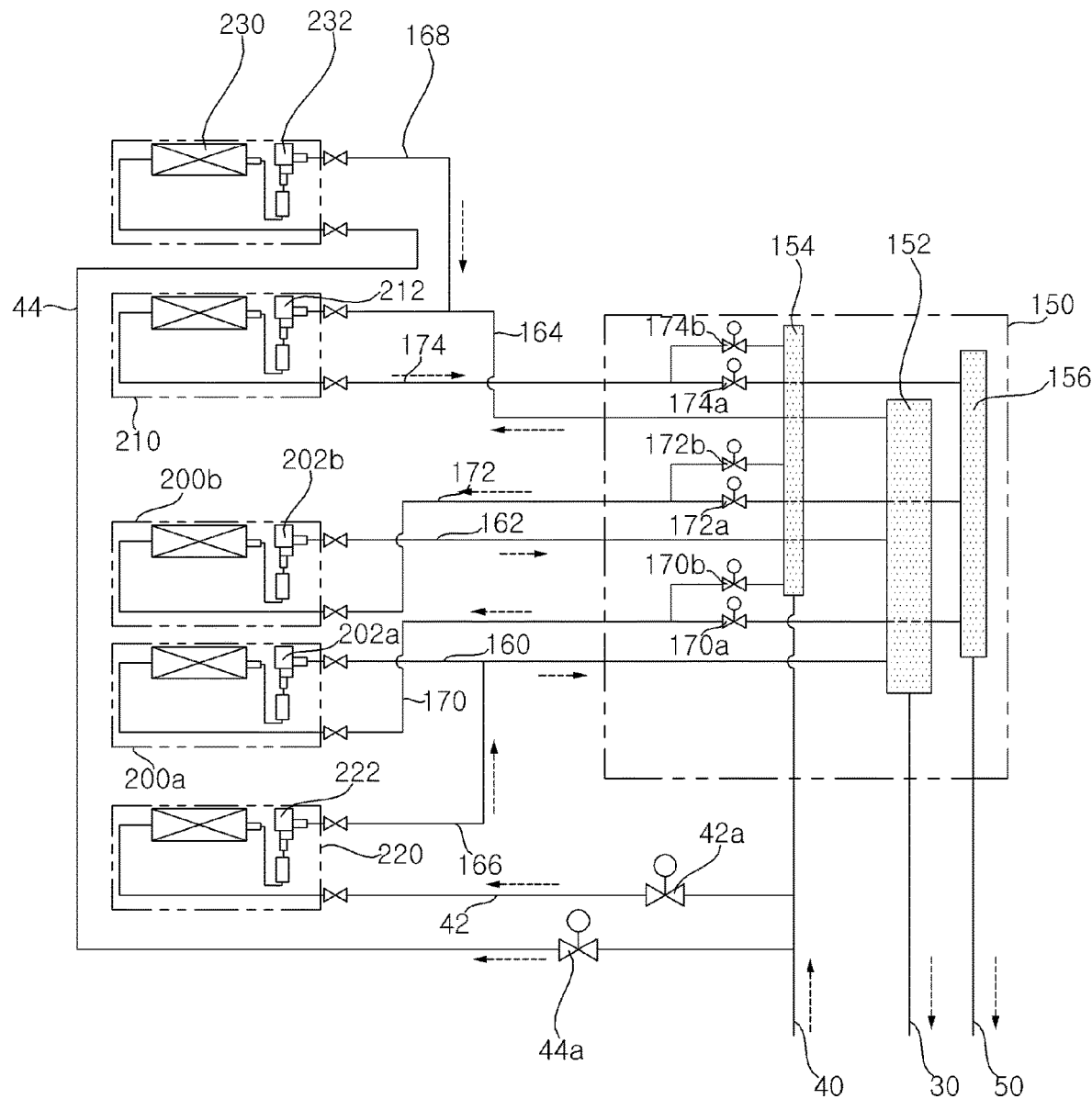
FIG. 5B is a diagram illustrating a flow of a refrigerant during a heating operation in the system view of FIG. 4.

Referring to FIG. 5B, during the heating operation of the air conditioner, the first main heat exchanger 200a and the second main heat exchanger 200b are connected to each of the high-pressure refrigerant header 154 and the liquid refrigerant header 152. During the heating operation of the air conditioner, the recovery heat exchanger 210 is connected to each of the liquid refrigerant header 152 and the low-pressure refrigerant header 156.

The first opening and closing valve 42a, disposed at the first refrigerant branch line 42, is opened during the heating operation of the air conditioner. The second opening and closing valve 44a, disposed at the second refrigerant branch line 44, is closed during the heating operation of the air conditioner. That is, during the heating operation of the air conditioner, the high-pressure gaseous refrigerant, flowing in the high-pressure refrigerant line 40, flows to each of the reheat exchanger 220 and the preheat exchanger 230.

Referring to FIG. 5B, during the heating operation of the air conditioner, the first opening and closing valve 42a is opened such that the high-pressure gaseous refrigerant, flowing through the high-pressure refrigerant pipe 40, may flow to the reheat exchanger 220 through the first refrigerant branch line 42. The refrigerant, having passed through the reheat exchanger 220, flows through the first liquid joined line 166 to the first indoor liquid line 160 and to the first main heat exchanger 200a.

Referring to FIG. 5B, during the heating operation of the air conditioner, the second opening and closing valve 44a is opened such that a high-pressure gaseous refrigerant, flowing through the high-pressure refrigerant line 40, may flow to the preheat exchanger 230 through the second refrigerant branch line 44. The refrigerant, having passed through the preheat exchanger 230, flows through the second liquid joined line 168 to the third indoor liquid line 164 and to the recovery heat exchanger 200.

During the heating operation of the air conditioner, the first main heat exchanger 200a and the second main heat exchanger 200b heat the air flowing in the supply passage 120. During the heating operation of the air conditioner, the recovery heat exchanger 210 cools the air flowing in the discharge passage 122. During the heating operation of the air conditioner, the reheat exchanger 220 and the preheat exchanger 230 may heat the air flowing in the supply passage 120.

During the heating operation of the air conditioner, the air flowing in the supply passage 120 may be primarily heated by the preheat exchanger 230 disposed at the inlet end of the supply passage 120.

During the heating operation of the air conditioner, the air having passed through the preheat exchanger 230 is heat exchanged with the indoor air by the total heat exchanger 130. During the heating operation of the air conditioner, the air flowing in the supply passage 120 may be secondarily heated by heat exchange with warm air flowing in the discharge passage 122.

During the heating operation of the air conditioner, the air flowing in the supply passage 120 after passing through the total heat exchanger 130 is heated by passing through the first main heat exchanger 200a and the second main heat exchanger 200b. During the heating operation of the air conditioner, the flowing air, having passed through the first main heat exchanger 200a and the second main heat exchanger 200b, may be heated by passing through the reheat exchanger 220.

During the heating operation of the air conditioner, the air flowing in the discharge passage 122 is heat exchanged with the outside air by the total heat exchanger 130. During the heating operation of the air conditioner, the air flowing in the discharge passage 122 may be cooled by passing through the recovery heat exchanger 210.

During the heating operation of the air conditioner, the refrigerant discharged from the compressor 12 is supplied to the high-pressure refrigerant line 40 through the first switching valve 18.

Although the preferred embodiments of the present disclosure have been disclosed with reference to the illustrated drawings, those skilled in the art will appreciate that the present disclosure is not limited to those exemplary embodiments and various modifications, additions and substitutions are possible, without departing from the scope and spirit of the disclosure as disclosed in the accompanying claims. Such modifications should not be individually understood from the technical spirit or prospect of the present disclosure.

What is claimed is:

1. An air conditioner, comprising:
   an outdoor unit having a compressor configured to compress a refrigerant and an outdoor heat exchanger configured for heat exchange between the refrigerant and outside air; and
   a ventilator connected to the outdoor unit by a plurality of refrigerant pipes, the ventilator being configured to allow the outside air to pass through at least one heat exchanger and flow into an indoor space and allow indoor air to pass through the at least one heat exchanger and flow to an outdoor space,
   wherein the ventilator comprises:

a case having a supply passage, through which the outside air flows into the indoor space, and a discharge passage through which the indoor air is discharged to the outdoor space;

a main heat exchanger disposed in the supply passage, the main heat exchanger being configured to exchange heat between the outside air and the refrigerant;

a recovery heat exchanger disposed in the discharge passage, the recovery heat exchanger being configured to exchange heat between the indoor air and the refrigerant; and a refrigerant distributor connected to the outdoor unit by the plurality of refrigerant pipes, the refrigerant distributor being configured to supply the refrigerant introduced from the outdoor unit to the main heat exchanger or the recovery heat exchanger, or supply the refrigerant introduced from the main heat exchanger or the recovery heat exchanger to the outdoor unit; and a reheat exchanger disposed downstream of the main heat exchanger in the supply passage and connected to one of the plurality of refrigerant pipes, the reheat exchanger being configured to heat the air flowing in the supply passage, and wherein the plurality of refrigerant pipes comprise:
a liquid refrigerant line connected to the outdoor heat exchanger disposed in the outdoor unit;
a high-pressure refrigerant line configured to allow a flow of the refrigerant compressed by the compressor; and
a low-pressure refrigerant line configured to deliver the refrigerant to the compressor.

2. The air conditioner of claim 1, wherein the main heat exchanger is connected to the refrigerant distributor by a first indoor liquid line and a first indoor unit pipe, and
wherein the reheat exchanger is connected to the first indoor liquid line, such that the refrigerant, having passed through the reheat exchanger, flows to the first indoor liquid line.

3. The air conditioner of claim 1, wherein the reheat exchanger has a smaller area than the main heat exchanger.

4. The air conditioner of claim 1, wherein the plurality of refrigerant pipes further comprises a first refrigerant branch line branched from the high-pressure refrigerant line and configured to deliver the refrigerant discharged from the compressor to the reheat exchanger.

5. The air conditioner of claim 2, wherein the first refrigerant branch line has a first opening and closing valve configured to open and close a passage formed in the first refrigerant branch line.

6. The air conditioner of claim 3, wherein the first opening and closing valve is configured to adjust an amount of the refrigerant supplied to the reheat exchanger.

7. The air conditioner of claim 1, wherein the refrigerant distributor comprises:
a liquid refrigerant header connecting the liquid refrigerant line with each of the main heat exchanger and the recovery heat exchanger which are disposed on an inner surface of the case;
a high-pressure refrigerant header connecting the high-pressure refrigerant line with each of the main heat exchanger and the recovery heat exchanger; and
a low-pressure refrigerant header connecting the low-pressure refrigerant line with each of the main heat exchanger and the recovery heat exchanger.

8. The air conditioner of claim 7, wherein the liquid refrigerant header is configured to supply the refrigerant, flowing from the main heat exchanger, to the recovery heat exchanger or to supply the refrigerant, flowing from the recovery heat exchanger, to the main heat exchanger.

9. The air conditioner of claim 1, further comprising a total heat exchanger disposed over the supply passage and the discharge passage and configured to exchange heat between indoor air and outdoor air by rotating.

10. The air conditioner of claim 9, wherein the total heat exchanger is disposed upstream of both the main heat exchanger and the recovery heat exchanger.

11. The air conditioner of claim 1, further comprising a preheat exchanger disposed in the supply passage and connected to the high-pressure refrigerant line, the preheat exchanger configured to heat the air flowing in the supply passage.

12. The air conditioner of claim 11, wherein the preheat exchanger is disposed at an inlet end of the supply passage.

13. The air conditioner of claim 11, further comprising:
a second refrigerant branch line branched from the high-pressure refrigerant line and configured to deliver the refrigerant, discharged from the compressor to the preheat exchanger;
a second opening and closing valve configured to open and close a passage formed in the second refrigerant branch line.

14. The air conditioner of claim 13, wherein the second opening and closing valve is configured to close the passage formed in the second refrigerant branch line during a cooling operation in which the refrigerant flows from the liquid refrigerant header to the main heat exchanger.

* * * * *